US009994008B2

(12) United States Patent
Coxon et al.

(10) Patent No.: US 9,994,008 B2
(45) Date of Patent: Jun. 12, 2018

(54) METHOD AND SYSTEM FOR COMPACTING COMPOSITE PART LAYUP UTILIZING A SINGLE RELEASE FILM LAYER

(71) Applicant: The Boeing Company, Chicago, IL (US)

(72) Inventors: Brad Coxon, Everett, WA (US); Kurtis Willden, Everett, WA (US)

(73) Assignee: The Boeing Company, Chicago, IL (US)

( * ) Notice: Subject to any disclaimer, the term of this patent is extended or adjusted under 35 U.S.C. 154(b) by 822 days.

(21) Appl. No.: 14/491,228

(22) Filed: Sep. 19, 2014

(65) Prior Publication Data

US 2016/0082710 A1   Mar. 24, 2016

(51) Int. Cl.
*B32B 37/10* (2006.01)
*B30B 5/02* (2006.01)
*B29C 70/44* (2006.01)
*B29C 70/54* (2006.01)
*B30B 9/22* (2006.01)

(52) U.S. Cl.
CPC .......... *B32B 37/1018* (2013.01); *B29C 70/44* (2013.01); *B29C 70/54* (2013.01); *B30B 5/02* (2013.01); *B30B 9/22* (2013.01); *B32B 2323/04* (2013.01)

(58) Field of Classification Search
CPC ..... B29C 70/44; B29C 70/54; B32B 37/1018; B32B 5/02; B32B 9/22
See application file for complete search history.

(56) References Cited

U.S. PATENT DOCUMENTS

| 5,129,813 A * | 7/1992 | Shepherd | B29C 70/44 156/286 |
| 5,464,337 A * | 11/1995 | Bernardon | B29C 33/302 264/257 |
| 6,977,057 B2 | 12/2005 | Reitz et al. | |
| 8,105,068 B2 * | 1/2012 | Ross | B29C 70/443 425/387.1 |
| 2008/0182054 A1 * | 7/2008 | Ridges | B29C 70/30 428/35.2 |

(Continued)

OTHER PUBLICATIONS

Clements, Linda L., "Vacuum bagging technology improved," High-Performance Composites, Jan./Feb. 2000, pp. 33-37.

*Primary Examiner* — Christopher T Schatz
(74) *Attorney, Agent, or Firm* — McDonnell Boehnen Hulbert & Berghoff LLP

(57) ABSTRACT

System and method for compacting a composite ply layup comprising a forming tool comprising a top surface and a composite ply layup laid up along the top surface of the forming tool. A single release film comprising a top surface and a bottom surface, wherein the bottom surface of the single release film comprises a first non-planar bottom surface. The first non-planar bottom surface placed over a top surface of the composite ply layup. A venting port operatively coupled directly to the top surface of the single release film. A vacuum source operatively coupled to the venting port and configured to generate a vacuum to the single release film, such that the first non-planar bottom surface of the single release film defines a breather path for the vacuum generated by the vacuum source to distribute over the top surface of the composite ply layup.

13 Claims, 4 Drawing Sheets

(56) References Cited

U.S. PATENT DOCUMENTS

| | | | |
|---|---|---|---|
| 2009/0243128 A1* | 10/2009 | Nelson | B29C 43/3642 264/40.1 |
| 2013/0126386 A1 | 5/2013 | Dull | |
| 2013/0143006 A1 | 6/2013 | Ferguson | |
| 2014/0117582 A1 | 5/2014 | Wilkerson et al. | |
| 2014/0199768 A1 | 7/2014 | Harris et al. | |
| 2014/0202630 A1 | 7/2014 | Misciagna | |

* cited by examiner

66a

Vertical

66b

Horizontal

66c

Radial

66d

Cross-hatched

66e

Circular

66f

Isotropic

METHOD AND SYSTEM FOR COMPACTING COMPOSITE PART LAYUP UTILIZING A SINGLE RELEASE FILM LAYER

FIELD OF THE INVENTION

The present disclosure relates generally to compacting composite part layups. More particularly, the present disclosure is related to compacting composite part layups utilizing a single release film layer wherein the release film comprises a non-planar bottom surface. Such a non-planar bottom surface may comprise an embossed surface, a textured surface, or other similar type of non-planar surface. The non-planar surface may comprise a uniform or non-uniform non-planar surface.

BACKGROUND

Composite laminates and structures are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft manufacturing and assembly, such composite laminates and structures are used in increasing quantities to form the fuselage, wings, tail section, skin panels, and other components.

Aerospace manufacturers increasingly use composite laminates in an effort to reduce the weight and increase the performance of some components. Composite laminates used by the aerospace industry typically comprise a fiber-reinforced composite material. Fiber-reinforced composite materials of this type generally comprise two essential components, namely firstly the fibers and secondly a polymer matrix which surrounds the fibers. The matrix encompasses the fibers and, in the case of thermosetting polymer matrices, is cured and consolidated by a thermal treatment, such that three-dimensional cross-linking takes place. This cure and consolidation has the effect that the fibers are bonded firmly to one another and trapped air and volatiles are removed from the laminate. Similar thermal processing may occur for thermoplastic polymer matrices also resulting in consolidation of the final composite laminate. A range of suitable fiber materials may be used for high performance applications, most commonly carbon fibers but also glass or aramide fibers may be used as well.

A composite component comprising a fibrous material in a matrix material may be produced by arranging one or more ply layers of fibrous material on a forming tool, compacting and then curing the component to form a consolidated component. Conventional compacting methods at certain temperatures (e.g., above 80 degrees F.) for use with composite part layups typically utilize a three-layer system for compacting composite ply layers. In such conventional methods, the first layer may comprise a release film. Release films interact with a top pre-preg surface and must be able to release itself post cure so that little if any of the resin from the pre-preg layup is removed when removing the release film.

The second layer typically comprises a breather material. Such breather materials may be positioned over a surface of a part layup that is subsequently processed under vacuum beneath a sealed vacuum bag. The breather provides a generally uniform breathing path on the surface of the layup that allows air and volatiles to escape from the layup during compaction and curing processing cycles. Removing air and volatiles is desirable in order to reduce part porosity and improve part performance.

The third layer is a vacuum bag for applying pressure to the composite part. Typically, such a vacuum bag comprises a flexible film and is used to enclose the part layup and seal the various component parts of the vacuum bag assembly from outside air. The edges of the vacuum bag are sealed against the edges of the forming tool surface to enclose the part layup against an air-tight mold.

Although most conventional composite compaction systems usually achieve acceptable results, the process of utilizing a combination of a release film, a breather material, and a vacuum bag has certain limitations. For example, the process steps of overlaying the various structures making up the vacuum bag assembly are tedious and labor intensive. In addition, this three level process involves high material costs. Therefore, use of such procedures for such known methods may result in increased manufacturing time, and in turn, increased manufacturing costs. Moreover, use of a three layered system must also be debulked one or more times in order to ensure that the vacuum bag, the release layer and the breather layers all properly conform to oftentimes complex contoured surfaces during composite pre-preg layup and/or compaction. Often, when issues arise from improper debulking, each of the grouping of plies within the part layup may not be properly consolidated, thereby reducing the overall quality of the final cured composite.

There are certain known nylon vacuum bags, such as those provided by Cytec and Airtech under the brand names of Quickdraw and Airdraw, having certain embossed features. However, such embossed nylon vacuum bags have certain limitations when used in systems for compacting composite ply layups. For example, it has been observed that using such embossed nylon vacuum bags tend to remove resin from the composite part layup post cure. Removing resin from the composite part layup can tend to decrease composite performance, such as by adversely affecting the resin-to-ply ratio, oftentimes a critical design parameter of a particular composite laminate.

Accordingly, there is a need for a vacuum bag assembly that may be quickly and easily placed or draped over the entire surface area of a part layup and which conforms to complex part contours during vacuum bag processing. There is also a need for a method of vacuum bagging composite parts that reduces labor costs and material waste, and which avoids or perhaps limits certain costly bagging material costs, such as breather layers and/or vacuum bags. There is also a need for creating a more efficient system for vacuum bagging a composite ply layup, a system that can reduce the amount of touch labor required to prepare a composite ply layup for compaction.

SUMMARY

According to an exemplary arrangement, embodiments of improved methods for manufacturing composite layups is presented. For example, in one arrangement, a system for compacting a composite ply layup comprises a forming tool comprising a top surface, a composite ply layup laid up along the top surface of the forming tool, and a single release film comprising a top surface and a bottom surface. The bottom surface of the single release film comprises a first non-planar bottom surface, wherein the first non-planar bottom surface is placed over a top surface of the composite ply layup. A venting port is operatively coupled directly to the top surface of the single release film.

In one arrangement, the system comprises a vacuum source that is operatively coupled to the venting port and configured to generate a vacuum to the single release film, such that the first non-planar bottom surface of the single release film defines a breather path for the vacuum generated by the vacuum source to distribute over the top surface of the composite ply layup.

In one arrangement, the system further comprises a heating source. The heating source providing heat to the composite ply, the heat provided at a predetermined temperature.

The features, functions, and advantages can be achieved independently in various embodiments of the present disclosure or may be combined in yet other embodiments in which further details can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In one arrangement, the disclosed single release film may comprise a single sheet or film that is adapted to cover an area of a composite part layup, and conform to complex surface contours of the part. Use of a single release film provides many advantages. For example, it reduces the amount of touch labor required to compact layups. In addition, the use of a single release film may also reduce material waste resulting from the need for an additional breather layer as well as an additional vacuum bag. In one aspect, the single release film comprises both a top surface and a bottom surface. Preferably, the bottom surface of the single release film comprises a non-planar bottom surface. In one arrangement, the non-planar bottom surface comprises a textured surface, an embossed surface, and/or other similar type of surface.

In one type of textured surface, a plurality of ridges are provided. In one type of embossed surface, a plurality of cavities are provided. The plurality of ridges or plurality of cavities allow the single release film to conform to surface features and contours on a top surface of the composite part layup. As such, the presently disclosed non-planar surfaces also provide a uniform vacuum along the top surface of the composite part layup. The ridges and/or cavities that are provided along the bottom surface of the single release film may be formed on the film using common forming techniques. Additionally, the ridges and/or cavities provided along the bottom surface of the single release film may have various dimensions, shapes, and geometrical orientations that tailor one or more portions of the release film to create a desired vacuum state along the top surface of the composite part. Indeed, various ridge and/or cavity patterns for the film may be used to satisfy various cure temperature requirements, thicknesses, tensile strengths, adhesion, upper service temperatures of the composite part layup.

Figure 1:
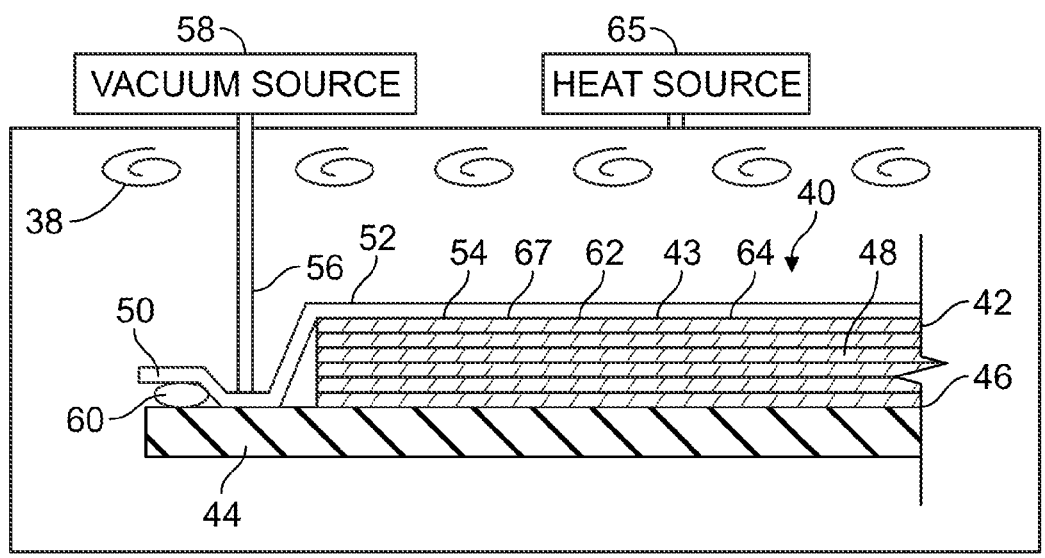
FIG. 1 is an illustration of a cross-sectional view of an embodiment of a vacuum bag assembly according to one aspect of the disclosure.

FIG. 1 is an illustration of a cross-sectional view of an embodiment of a vacuum bag assembly 40 according to one aspect of the disclosure. Referring first to FIG. 1, a vacuum bag assembly 40 may be used to form, compact, and/or consolidate a composite part layup 42 comprising a plurality of plies 48. Vacuum bag assembly 40 broadly comprises a forming tool 44, a single release film 50, and an edge sealant 60. The single release film 50 comprises a top surface 52 and a bottom surface 54. In addition, the single release film 50 is operatively coupled by way of a venting port 56 to a suitable vacuum source 58. The vacuum source 58 may be operated for drawing a vacuum within the release film 50.

As illustrated, the venting port 56 extends through the top surface 52 of the single release film and is operatively coupled to the bottom surface of the single release film 50. This port 56 allows for the evacuation of air and volatiles from within the single release film 50 during processing. In the illustrated embodiment, the composite part layup 42 comprises a generally flat top surface 43 and is made up of a plurality of plies 48. The composite part layup 42 shown in FIG. 1 is merely illustrative of a wide range of composite parts having simple or complex contoured surfaces and/or one or more curved sides.

The composite part layup 42 may comprise one or more prepregs comprising a matrix material. Such a matrix material may comprise a thermoset matrix material or alternatively a thermoplastic matrix material. For example, wherein a prepreg comprises a thermoset matrix material, such material may comprise polyester, vinyl ester, polyurethane, epoxy, phenolic, cyanate ester, bismaleimide (BMI), polyimide resins, or other similar materials. Were a prepreg within the composite layup 42 comprises a thermoplastic matrix material, such material may include polycarbonate (PC), Polyamide (PA), polyethylene (PE), polyethylene terephthalate (PET), polyetheretherketone (PEEK), polyetherketoneketone (PEKK), plosulfone (PSU), ployamideimide (PAI), polyphenlue suldife (PPS), or other similar types of matrix materials.

The forming tool 44 includes a generally flat tool upper tool surface 46. However, in other embodiments, the tool surface 46 may have one or more curves or contours, depending upon the geometry of the composite part being fabricated.

The single release film 50 comprises a material that is selected to withstand certain cure temperatures and pressures that are typically experienced during composite cure. For example, the single release film 50 may comprise a material that is selected to withstand thermoset resin fully react or "cure" temperatures typically ranging from room temperature to upwards of 650° F. (343° C.). As another example, the single release film 50 may comprise a material that is selected to withstand thermoplastic resin consolidation temperatures typically ranging in excess of 300° F. (149° C.), and with some engineering thermoplastics in excess of 650° F. (343° C.).

Preferably, such suitable single release film materials comprise a thermoplastic release film. More preferably, the single release film is selected from the group consisting of polyethylene, ethylene-tetrafluorethylene, polyvinyl fluoride, or polytetrafluorethylenes.

An edge sealant 60 surrounds the outer edges of the composite part layup 42. The edge sealant 60 functions to allow air and volatiles to escape from the part layup 42 when it is heated and compacted. The single release film 50 covers substantially the entire surface area of the part layup 42. The single release film 50 comprises a top surface 52 and a bottom surface 54 wherein the bottom surface preferably comprises a first non-planar bottom surface 62.

The bottom surface 54 may comprise plurality of non-uniformities. Such non-uniformities may be designed to function to allow the release film 50 to expand by stretching thereby enabling the release film 50 to readily conform to the contoured surface areas of the forming tool 44. Advantageously, such a single release film 50 may be draped directly over the part layup 42 during assembly of the component shown in FIG. 1, and a venting port 56 provided directly to the top surface 52 of the release film 50. Such a vacuum bag assembly 40 thereby eliminates the use of a separate breather material that must be placed over and around the contoured surface areas, and therefore reducing the time and material expense required to prepare the layup 42 for vacuum bag processing. Such a construction further eliminates a need for a separate vacuum bag and breather arrangement that must be provided over and around the contoured surface areas, and therefore further reducing the time required to prepare the layup 42 for vacuum bag processing.

As noted above, a first non-planar surface 62 of the bottom surface 54 of the single release film 50 may comprise an embossed surface. In one arrangement, the first non-planar bottom surface 62 comprises a plurality of cavities. Alternatively, the first non-planar bottom surface 62 comprises a uniform or a repeating pattern of a plurality of cavities provided along the bottom surface of the film.

Alternatively, in one arrangement, the first non-planar surface 62 of the bottom surface 54 of the single release film 50 comprises a textured surface. In one textured surface arrangement, the textured surface comprises a plurality of ridges. As just one example, the textured surface may comprise a pattern of a plurality of ridges. Such pattern of the plurality of ridges comprises a uniform or a repeating pattern of ridges. The plurality of ridges may have a uniform or a non-uniform height along the bottom surface 54 of the release film 50. For example, in one exemplary arrangement, the plurality of ridges may have a height of between about 0.25 inches to about 0.5 inches.

In another preferred release film arrangement, the bottom surface 54 of the single release film 50 may comprise a second non-planar bottom surface 64. The second non-planar surface 64 may be different than the first non-planar bottom surface 62. For example, in one release film arrangement, the first portion of the bottom surface 62 of the single release film 50 may comprise a first non-planar bottom surface comprising a plurality of ridges and the second non-planar bottom surface 64 may comprise a plurality of cavities. Of course, other non-planar bottom surface configurations may also be used and may depend on the geometrical configuration of the composite part layup. For example, the geometrical configuration of the composite part layup may call for a single release film having a bottom surface comprising both a non-planar surface along one bottom portion of the film and a planar surface along a different bottom portion of the film.

Figure 2A:
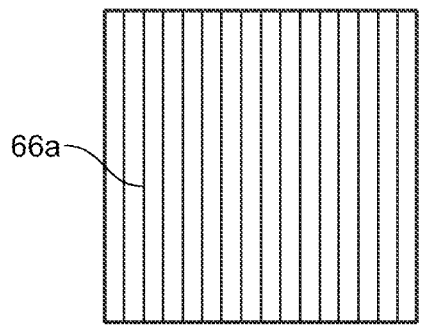
FIGS. 2a-f illustrate exemplary arrangements of the non-planar portions of the bottom surface of a single release film.

The size, number, location, and shape of the non-planar portions of the bottom surface of the release film 50 may vary, depending upon the application and the surface contours and features of the composite part layup 42. For example, FIGS. 2a-f illustrates only a few exemplary arrangements of the non-planar portions of the bottom surface of a single release film, such as the release film 50 illustrated in FIG. 1. For example, FIG. 2a, illustrates a plurality of ridges 66a arranged on the bottom surface wherein such ridges are arranged in adjacent, vertically substantially parallel rows and are uniformly offset from each other. A length of each of the ridges, as well as a distance between ridges in adjacent rows vary, depending upon the application. Also, the width of each of the ridges may vary. While the embodiment shown in FIG. 2a illustrates ridges 66a that are substantially parallel to each other, in other embodiments, the ridges may be non-parallel.

Figure 2B:
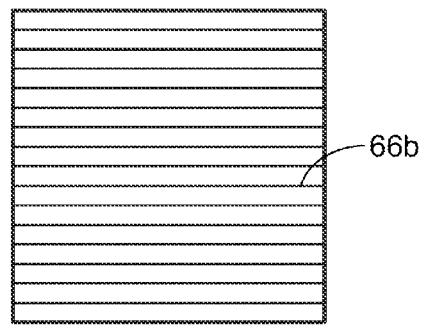
Figure 2C:
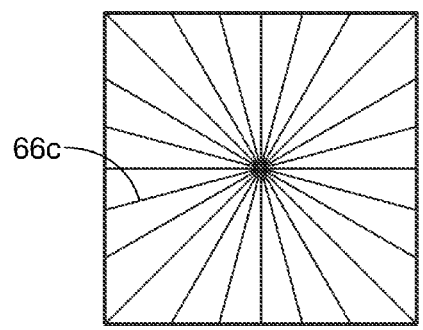
Figure 2D:
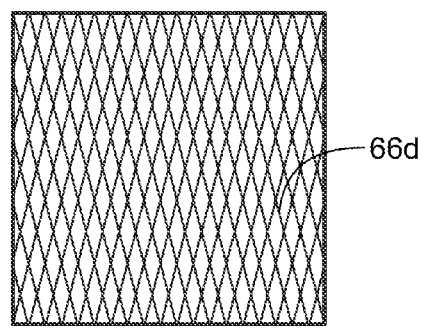
Figure 2E:
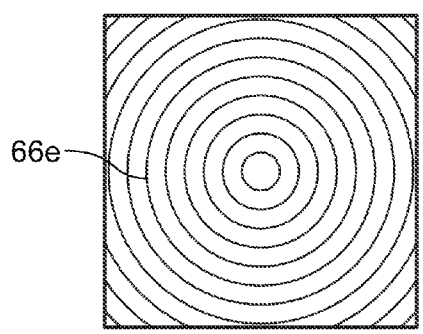
Figure 2F:
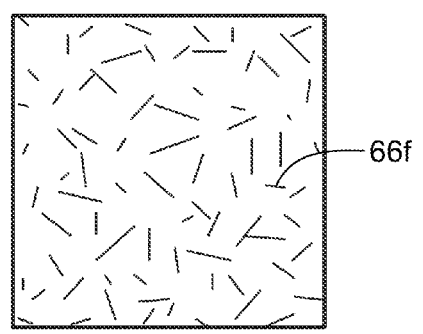

FIGS. 2b-2f illustrate alternative non-planar configurations that may be utilized on a bottom surface of a single release film. For example, the FIG. 2b illustrates a non-planar arrangement comprising a plurality of horizontal ridges 66b, FIG. 2c illustrates a non-planar arrangement comprising a plurality of radial ridges 66c, FIG. 2d illustrates a non-planar arrangement comprising a cross-hatched ridge configuration 66d, FIG. 2e illustrates a non-planar arrangement comprising a plurality of circular ridges 66e, and FIG. 2f illustrates a non-planar isotropic ridge arrangement 66f. Of course, these arrangements are merely illustrative and those of ordinary skill in the art will recognize that alternative non-planar arrangements may also be used.

As previously noted, the size, shape and location, as well as the number of the non-planar portions of the single release film may vary depending upon the application. For example, the first portion 62 of a release film 50 may comprise a plurality of vertical ridges 66a as illustrated in FIG. 2a while a second portion 64 of a release film 50 may comprise a plurality of radially directed ridges 66b as illustrated in FIG. 2b. In another or third portion 67 of the same single release film 50, the non-planar portions may also comprise a plurality of vertically oriented ridges 66a as illustrated in FIG. 2a. Essentially, the location of the non-planar portions, the ridge orientations and the spacing between them may vary, depending upon the application and the geometry of the composite part layup 42.

Returning to FIG. 1, a single release film 50 is used in the illustrated embodiment to cover the entire area of the part layup 42. However, in other applications, the advantageous benefits of the disclosed embodiments may be realized by using more than one of release film 50 to cover a single part layup.

A vacuum drawn within the release film 50 causes the evacuation of film 50. Evacuation of the film 50, forces the single release film 50 down onto to the contoured surfaces of the composite part layup 42 while compacting the part layup 42. Evacuation of the single release film 50 also causes air and volatiles to be drawn out of the part layup 42. The escaping air and volatiles exit the release film 50 by way of the outlet port 54. During the evacuation of the release film 50, the release film 50 forces the non-planar bottom surface 54 of the release film 50 down onto the contoured surfaces 43 of the part layup 42. The atmospheric pressure applied by the release film 50 causes the non-planar bottom surface 54 of the release film 50 to conform to the contoured surfaces 43 as required.

As the release film 50 presses down onto the part layup 42, the non-planar portion of the bottom surface 54 of the release film 50, allowing the areas of the film to conform to the local contours of the part layup 42. Importantly, the non-planar bottom portion 54 of the release film 50 provides a breather path for the vacuum to distribute over the entire top surface of the part layup 42.

Once a desired compaction pressure to the layup 42 has been achieved, the vacuum assembly 40 containing the composite part layup may be heated. Where the composite layup comprises a thermoset resin matrix, a controlled application of heat energy 38 (typically temperatures above 80 degrees F.) by way of a heat source 65 has the effect of initiating a polymerization of the matrix material making up the composite part layup 42 wherein the fibers and the matrix material adhesively bond to one another, so that the fiber-composites component is created. A different heating process may be used where the composite layup part 42 comprises a thermoplastic type resin matrix. Heating of the composite part layup 42 may be performed, for example, by means of convection heat source or by means of electromagnetic heat source. Typically, such convection heating of the composite occurs within an autoclave and such electromagnetic heating of the composite occurs within a magnetron. Alternatively, the heat source may comprise a separate heating element (e.g., a heating blanket).

Figure 3:
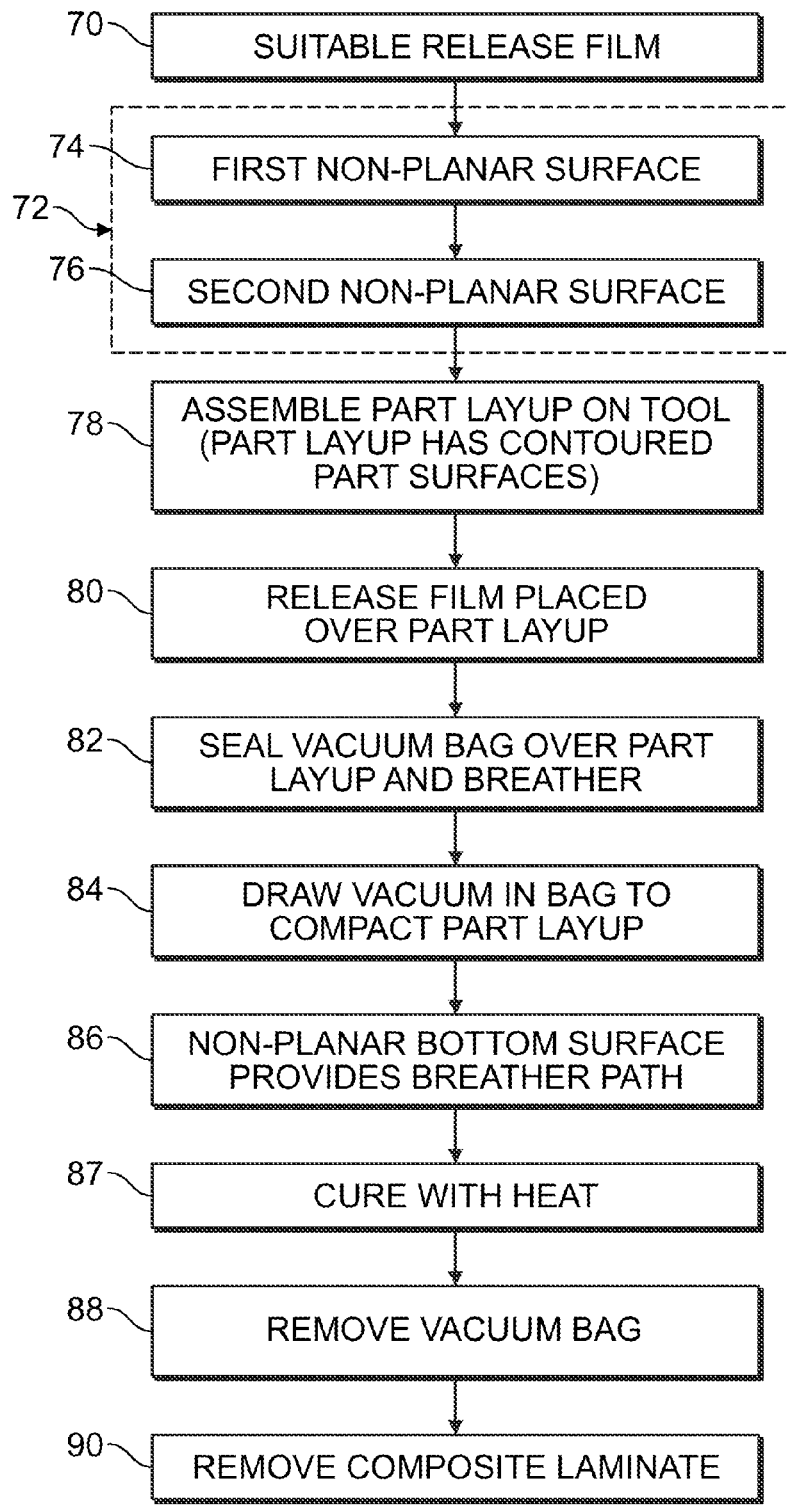
FIG. 3 illustrates steps of a method of fabricating a composite part.

Attention is now directed to FIG. 3 which illustrates the steps of a method of fabricating a composite part, using the previously described single release film 50 comprising a non-planar bottom surface 54. Beginning at step 70, a sheet of a suitable release film material is provided. As previously mentioned, the release film may comprise a thermoplastic release film. More preferably, the single release film is selected from the group consisting of polyethylene, ethylene-tetrafluorethylene, polyvinyl fluoride, or polytetrafluorethylenes. The release film 50 may comprise one piece of material having an area that is sufficient to substantially cover the entire area of the part layup. The release film material may be selected for use with either thermoset, thermoplastic, or both types composite part layups.

At step 72, a bottom surface of the release film is processed so as to create a non-planar bottom surface. For example, at step 74, a first non-planar bottom surface 62 of the single release film 50 may be processed. Additionally, if determined during the composite part layup specification and design phase (See, e.g., FIG. 4 Step 96), a second non-planar bottom surface 64 may be processed at step 76. Optionally a third non-planar surface (not shown here) may be processed.

At step 78, a composite part layup 42 is laid up or assembled on a top surface of a forming tool 44. Composite part lay up may take place by way of conventional ply layup techniques, forming a part layup 42 that has one or more simple or complex contoured part surfaces. In one preferred arrangement, the various plies 48 of the composite part layup 42 may be laid up manually or by hand. In an alternative arrangement, the part layup 42 may be laid up using advanced fiber placement ("AFP") or automated tape laying ("ATP") manufacturing methods (or by any other known method) in the desired positions and orientations as determined during the composite laminate specification and design phase. (See, e.g., FIG. 4 Step 96).

At step 80, the single release film 50 is draped or placed over the part layup 42. In certain applications, the single release film maybe be stretched (if necessary) onto an upper surface of the part layup 42. Next, at step 82, the single release film 50 is sealed to the forming tool 44, covering the part layup 42.

At step 84, a vacuum is drawn in the single release film 50. This created vacuum forces the film 50 down onto a top surface 43 of the part layup 42 in order to compact and/or consolidate the part layup 22. Specifically, at step 86, this created vacuum forces the non-planar bottom surface of the release film 50 down onto a top surface of the part layup 42 and provides a breather path for the vacuum to distribute over the entire top surface of the part layup 42.

At step 87, the vacuum assembly containing the part layup 42 is cured with heat. For example, at step 87, the vacuum assembly may be placed within a conventional or surface-heating systems, such as those found in autoclaves. Curing in such a conventional heating system will heat the part layup from the outside in, as heat energy is transferred through the composite laminate's thickness. The process duration of a thorough cure, therefore, is determined by the rate of heat flow into the composite part layup 42. As such, the flow rate depends on the material's specific heat, thermal conductivity, density, and viscosity. With certain convection heating systems, the composite laminate may heat at an uneven rate, which can stress the final cured laminate. Therefore, the temperature in the autoclave and a convection heating source is typically ramped up and down slowly in an attempt to minimize part stress.

After the heating step 87 has taken place, at step 88, the single release film 50 and other components of the vacuum bag assembly 40 are removed.

At the end of this curing process, the composite laminate is substantially cured and the plies within the laminate are consolidated so to form a continuous, cured composite laminate. At step 90, the cured composite laminate may then be removed from the vacuum bag assembly, the various other component parts may be removed from the composite laminate assembly, and the various components parts are allowed to cool before any further finishing processing steps take place.

Figure 4:
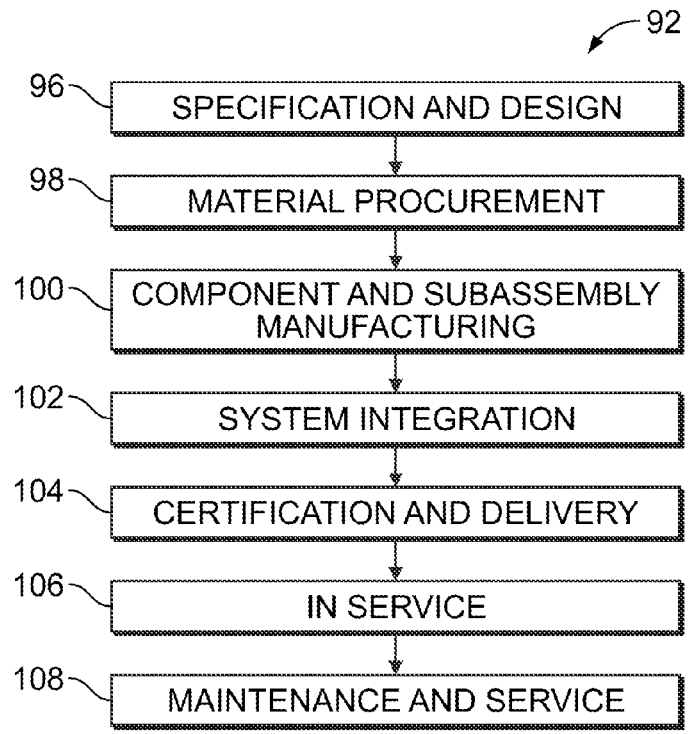
FIG. 4 is an illustration of a flow diagram of aircraft production and service methodology.
Figure 5:
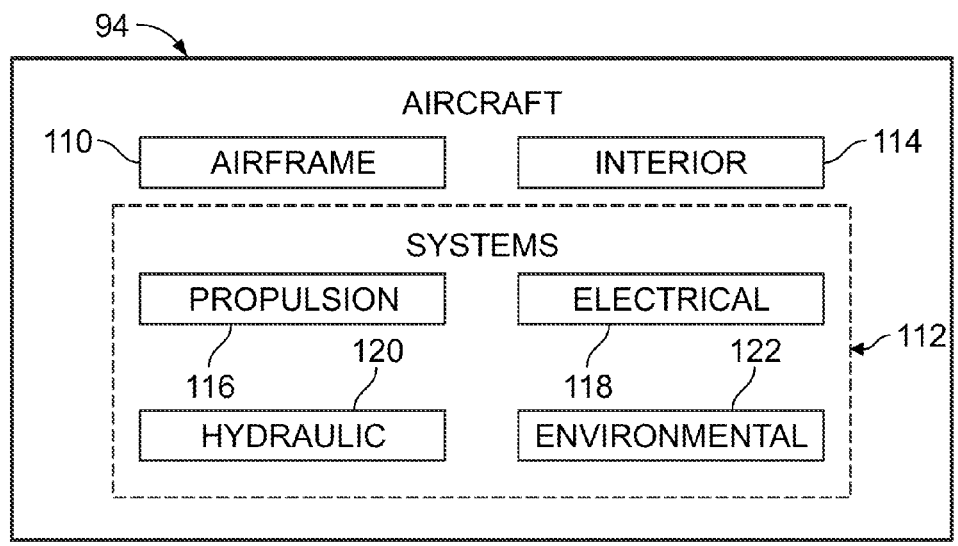
FIG. 5 is an illustration of a block diagram of an aircraft.

Embodiments of the disclosure may find use in a variety of potential applications, particularly in the transportation industry, including for example, aerospace, marine, automotive applications and other application where automated layup equipment may be used. Therefore, referring now to FIGS. 4 and 5, embodiments of the disclosure may be used in the context of an aircraft manufacturing and service method 92 as shown in FIG. 4 and an aircraft 94 as shown in FIG. 5. Aircraft applications of the disclosed embodiments may include, for example, without limitation, layup, compaction and curing any of a wide range of composite parts and components, such as, without limitation, stiffener members including beams, spars and stringers, to name only a few. During pre-production, exemplary method 92 may include specification and design 96 of the aircraft and material procurement 98.

As just one example, for the specification and design of the aircraft related composite laminates cured by utilizing a single release film as herein disclosed, the type and geometrical properties of non-planar bottom surface of the single release film may be determined at this design step 96. Additionally, at this design step 96, the underlying material of the single release film 50 may be selected based on the specific cure temperature and/or cure pressures of the composite part layup that is to be compacted and then cured.

Moreover, the size, number, location, and shape of the non-planar portions of the bottom surface of the release film 50 may also be determined at this design stage 96 as the non-planar bottom surfaces of various types of release films may vary, depending upon the surface contours and features of the composite part layup 42.

As another example, during this specification and design step 96, in one particular composite laminate arrangement, the type of matrix material for the composite part layup may be chosen and therefore the proper amount of heat and time for this application will be predetermined as the heating source is typically ramped up and down slowly in an attempt to minimize part stress and maximize overall temperature control. As such, operation and duty cycles of the heating source may also be determined during this specification and design step 96. In addition, during this specification and design step 96, the type of composite laminate layup may be determined. For example, during this process step 96, it may be determined that either a manual or an automatic layup may be desired.

During production, component and subassembly manufacturing 100 and system integration 102 of the aircraft 94 takes place. Thereafter, the aircraft 94 may go through certification and delivery 104 in order to be placed in service 106. While in service by a customer, the aircraft 94 is scheduled for routine maintenance and service 106, which may also include modification, reconfiguration, refurbishment, and so on.

Each of the processes of method 92 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 5 the aircraft 94 produced by exemplary method 92 may include an airframe 110 with a plurality of systems 112 and an interior 114. Examples of high-level systems 112 include one or more of a propulsion system 116, an electrical system 118, a hydraulic system 120, and an environmental system 122. Any number of other systems may be included. Although an aerospace example is shown, the principles of the disclosure may be applied to other industries, such as the marine and automotive industries.

Systems and methods embodied herein may be employed during any one or more of the stages of the production and service method 92. For example, components or subassemblies corresponding to production process 100 may be fabricated or manufactured in a manner similar to components or subassemblies produced while the aircraft 94 is in service 106. Also, one or more apparatus embodiments, method embodiments, or a combination thereof may be utilized during the production stages 100 and 102, for example, by substantially expediting assembly of or reducing the cost of an aircraft 94. Similarly, one or more of apparatus embodiments, method embodiments, or a combination thereof may be utilized while the aircraft 94 is in service, for example and without limitation, to maintenance and service 108.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A system for compacting a composite ply layup, the system comprising:
    a vacuum bag assembly comprising:
        a forming tool comprising a top surface;
        a composite ply layup laid up along the top surface of the forming tool and comprising surface contours; and
        a single thermoplastic release film comprising a top surface and a bottom surface;
        wherein the bottom surface of the single thermoplastic release film comprises a first non-planar bottom surface and a second non-planar bottom surface,
        the second non-planar surface different than the first non-planar bottom surface,
        the first non-planar bottom surface and the second non-planar surface placed directly over a top surface of the composite ply layup, wherein the first non-planar bottom surface and the second non-planar surface define a breather path over the composite ply layup, wherein a size, location, and shape of the first non-planar surface and a size, location, and shape of the second non-planar surface are selected depending upon the surface contours of the composite ply layup; and
    a venting port operatively coupled directly to the top surface of the single thermoplastic release film of the vacuum bag assembly so as to allow the single thermoplastic release film to compact the composite ply layup without requiring a separate breather layer and a separate vacuum bag.

2. The system according to claim 1 further comprising a vacuum source operatively coupled to the venting port and configured to generate a vacuum to the single thermoplastic release film,
    wherein the breather path provides a path for the vacuum generated by the vacuum source to distribute over the top surface of the composite ply layup.

3. The system according to claim 2 further comprising a heating source providing heat to the composite ply, wherein the heat is provided at a predetermined temperature.

4. The system of claim 1, wherein the single thermoplastic release film is selected from the group consisting of polyethylene, ethylene-tetrafluorethylene, polyvinyl fluoride, or polytetrafluorethylenes.

5. The system of claim 1 wherein the first non-planar surface of the single thermoplastic release film comprises an embossed surface.

6. The system of claim 5 wherein the embossed surface comprises a plurality of cavities.

7. The system of claim 5 wherein the embossed surface comprises a uniform pattern of a plurality of cavities.

8. The system of claim 1 wherein the first non-planar surface of the single thermoplastic release film comprises a textured surface.

9. The system of claim 8 wherein the textured surface comprises a plurality of ridges.

10. The system of claim 8 wherein the textured surface comprises a pattern of a plurality of ridges.

11. The system of claim 10 wherein the pattern of the plurality of ridges comprises a uniform pattern.

12. The system of claim 8 wherein the plurality of ridges have a height between about 0.25 inches to about 0.5 inches.

13. The system of claim 8 wherein the textured surface comprises a repeating pattern of a plurality of ridges.

* * * * *